United States Patent
Ali et al.

(10) Patent No.: US 12,304,464 B2
(45) Date of Patent: May 20, 2025

(54) EGO VEHICLE HAVING A SYSTEM FOR PASSING A REMOTE VEHICLE ASSOCIATED WITH A PREDICTED SLOWDOWN EVENT

(71) Applicant: GM Global Technology Operations LLC, Detroit, MI (US)

(72) Inventors: Kamran Ali, Troy, MI (US); Donald K. Grimm, Utica, MI (US); Constandi John Shami, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 17/821,015

(22) Filed: Aug. 19, 2022

(65) Prior Publication Data

US 2024/0059278 A1 Feb. 22, 2024

(51) Int. Cl.
*B60W 30/09* (2012.01)
*B60W 30/095* (2012.01)
*B60W 40/04* (2006.01)
*B60W 50/00* (2006.01)
*B60W 50/14* (2020.01)

(52) U.S. Cl.
CPC ........ *B60W 30/09* (2013.01); *B60W 30/0956* (2013.01); *B60W 40/04* (2013.01); *B60W 50/0097* (2013.01); *B60W 50/14* (2013.01); *B60W 2050/143* (2013.01); *B60W 2050/146* (2013.01); *B60W 2554/80* (2020.02)

(58) Field of Classification Search
None
See application file for complete search history.

(56) References Cited

U.S. PATENT DOCUMENTS

| | | | |
|---|---|---|---|
| 10,106,168 B2* | 10/2018 | Shami | B60W 40/068 |
| 2010/0004853 A1* | 1/2010 | Siereveld | G01C 21/3453 |
| | | | 709/227 |
| 2010/0215254 A1* | 8/2010 | Prokhorov | G06V 20/58 |
| | | | 340/995.28 |
| 2010/0256852 A1* | 10/2010 | Mudalige | G08G 1/22 |
| | | | 701/24 |
| 2016/0229395 A1* | 8/2016 | Schmüdderich | G08G 1/167 |
| 2018/0039283 A1* | 2/2018 | Srivastava | B60W 40/13 |
| 2018/0111611 A1* | 4/2018 | MacNeille | B60W 30/18163 |

(Continued)

*Primary Examiner* — Daniel L Greene
*Assistant Examiner* — Robert L Pinkerton
(74) *Attorney, Agent, or Firm* — Vivacqua Crane, PLLC

(57) ABSTRACT

An ego vehicle includes a system having one or more input devices for generating an input signal associated with a remote vehicle. The system further includes a computer having one or more processors programmed to receive the input signal from the input device. The processor is further programmed to determine a speed profile of the remote vehicle based on the input signal, determine that the remote vehicle is a traffic impediment based on the input signal, and determine a predicted slowdown event associated with the traffic impediment and the speed profile. The processor is further programmed to generate an actuation signal, in response to the processor determining the speed profile, the traffic impediment, and the predicted slowdown event. The notification device provides the notification of the predicted slowdown event to a user in response to the notification device receiving the actuation signal from the processor.

16 Claims, 4 Drawing Sheets

(56) References Cited

U.S. PATENT DOCUMENTS

| | | | |
|---|---|---|---|
| 2018/0120119 A1* | 5/2018 | Payne | B60W 20/12 |
| 2019/0258251 A1* | 8/2019 | Ditty | G05D 1/0274 |
| 2020/0111358 A1* | 4/2020 | Parchami | G05D 1/028 |
| 2021/0104155 A1* | 4/2021 | Xu | B60W 50/14 |
| 2021/0124351 A1* | 4/2021 | Chen | G01S 13/865 |
| 2022/0144285 A1* | 5/2022 | Kang | B60W 40/107 |
| 2023/0150502 A1* | 5/2023 | Dickson | B60W 50/14 |
| | | | 701/95 |
| 2024/0051533 A1* | 2/2024 | Tang | B60W 50/0097 |

* cited by examiner

EGO VEHICLE HAVING A SYSTEM FOR PASSING A REMOTE VEHICLE ASSOCIATED WITH A PREDICTED SLOWDOWN EVENT

INTRODUCTION

The present disclosure relates to systems monitoring traffic congestion and controlling vehicles based on the traffic congestion, and more particularly to an ego vehicle having a system for determining a predicted slowdown event and enabling the ego vehicle to pass a remote vehicle associated with the predicted slowdown event.

Adaptive Cruise Control systems (ACC systems) maintain an ego vehicle at a predetermined distance following a remote vehicle and within an associated speed limit. The ACC system automatically adjusts the speed of the ego vehicle based on one or more input signals (e.g., input signals associated with a real-time speed of the remote vehicle immediately upstream of the ego vehicle). However, the ACC system may not operate the ego vehicle to pass the remote vehicle when the remote vehicle impedes traffic (e.g. with the remote vehicle travelling at a speed below a speed limit by a predetermined speed threshold, at an acceleration below a predetermined acceleration threshold, making a predetermined number of stops, etc.). The remote vehicle may impede traffic, such that the remote vehicle increases the travel time of the ego vehicle and delays arrival of the ego vehicle at a final destination. As a result, the increased travel time for the ego vehicle can increase the consumption of vehicle resources (e.g., fuel, battery resources, processing resources, and/or memory resources) and/or network resources (e.g., time domain resources and/or frequency domain resources) used to operate the ego vehicle among other examples.

Thus, while existing ACC systems achieve their intended purpose, there is a need for a new and improved system that addresses these issues.

SUMMARY

According to several aspects of the present disclosure, an ego vehicle includes a longitudinal control submodule for controlling a propulsion actuation device and/or a braking actuation device. The ego vehicle further includes a lateral control submodule for controlling a steering actuation device. The ego vehicle further includes a system having one or more input devices for generating an input signal associated with a remote vehicle. The system further includes one or more notification devices for providing a notification to a user that the remote vehicle is a traffic impediment associated with a predicted slowdown event. The system further includes a computer having one or more processors electronically connected to the longitudinal control submodule, the lateral control submodule, the input device, and the notification device. The computer further includes a non-transitory computer readable storage medium (CRM) storing instructions, such that the processor is programmed to receive the input signal from the input device. The processor is further programmed to determine that the remote vehicle is the traffic impediment based on the input signal. The processor is further programmed to determine a speed profile of the remote vehicle based on the input signal. The processor is further programmed to determine a predicted slowdown event associated with the traffic impediment and the speed profile based on the input signal. The processor is further programmed to generate an actuation signal, in response to the processor determining the speed profile, the traffic impediment, and the predicted slowdown event. The notification device provides the notification to the user to indicate the predicted slowdown event, in response to the notification device receiving the actuation signal from the processor.

In one aspect, the longitudinal control submodule controls the propulsion actuation device and/or the braking actuation device to enable the ego vehicle to pass the remote vehicle, in response to the longitudinal control submodule receiving the actuation signal from the processor. The lateral control submodule controls the steering actuation device to enable the ego vehicle to pass the remote vehicle, in response to the lateral control submodule receiving the actuation signal from the processor.

In another aspect, the processor is further programmed to determine a classification of the remote vehicle, in response to the processor receiving the input signal from the input device. The processor is further programmed to compare the classification to a lookup table including a plurality of predetermined classifications and a plurality of associated empirical speed profiles, in response to the processor determining the classification of the remote vehicle. The processor is further programmed to determine the speed profile of the remote vehicle, in response to the processor identifying the classification of the remote vehicle in the lookup table.

In another aspect, the processor is further programmed to determine one or more surrounding vehicles, in response to the processor receiving the input signal from the input device, where the remote vehicle and the surrounding vehicle are located in a common region and have a common make, a common model, a common model year, a common engine type, and/or a common engine size. The processor is further programmed to determine a surrounding speed profile of the surrounding vehicle. The processor is further programmed to define the speed profile of the remote vehicle as the surrounding speed profile of the surrounding vehicle.

In another aspect, the processor is further programmed to determine the predicted slowdown event, in response to the processor determining that the remote vehicle is the traffic impediment and further based on the input signal being associated with: an intersection located downstream of the remote vehicle; a highway onramp located downstream of the remote vehicle; a highway exit ramp located downstream of the remote vehicle; a traffic control device located downstream of the remote vehicle; a stop sign located downstream of the remote vehicle; a bus stop located downstream of the remote vehicle; a mail box located downstream of the remote vehicle; a business delivery entrance located downstream of the remote vehicle; a train crossing located downstream of the remote vehicle; and/or a curbside garbage pickup located downstream of the remote vehicle.

In another aspect, the processor is further programmed to determine a target lane to be navigated by the ego vehicle for passing the remote vehicle, in response to the processor receiving the input signal. The processor is further programmed to determine an obstruction level associated with the target lane, in response to the processor receiving the input signal from the input device. The processor is further programmed to compare the obstruction level to a predetermined obstruction threshold. The processor is further programmed to determine that the target lane is free of an obstruction, in response to the processor determining that the obstruction level is below the predetermined obstruction threshold. The processor is further programmed to generate the actuation signal, in response to the processor determining that the target lane is free of the obstruction. The processor is further programmed to determine that the target lane is not free of an obstruction, in response to the processor determining that the obstruction level is not below the predetermined obstruction threshold. The processor is further programmed to refrain from generating the actuation signal, in response to the processor determining that the target lane is not free of the obstruction.

In another aspect, the processor is further programmed to determine an upcoming turn for the ego vehicle and an associated closing distance between the upcoming turn and a current location of the remote vehicle. The processor is further programmed to compare the associated closing distance to a closing distance threshold. The processor is further programmed to generate the actuation signal, in further response to the processor determining that the associated closing distance is above the closing distance threshold. The processor is further programmed to refrain from generating the actuation signal, in response to the processor determining that the associated closing distance is not above the closing distance threshold.

In another aspect, the speed profile indicates an average acceleration of the remote vehicle, and the processor is further programmed to compare the average acceleration of the remote vehicle to an acceleration threshold. The processor is further programmed to determine that the remote vehicle is the traffic impediment, in response to the processor determining that the average acceleration is below the acceleration threshold.

In another aspect, the speed profile indicates an estimated weight of the remote vehicle, and the processor is further programmed to compare the estimated weight of the remote vehicle to a predetermined weight threshold. The processor is further programmed to determine that the remote vehicle is the traffic impediment, in response to the processor determining that the estimated weight is above the predetermined weight threshold.

In another aspect, the speed profile indicates an average speed of the remote vehicle, and the processor is further programmed to compare the average speed of the remote vehicle to a predetermined average speed threshold. The processor is further programmed to determine that the remote vehicle is the traffic impediment, in response to the processor determining that the average speed is below the predetermined average speed threshold.

In another aspect, the speed profile indicates a maximum speed of the remote vehicle, and the processor is further programmed to compare the maximum speed of the remote vehicle to a speed threshold. The processor is further programmed to determine that the remote vehicle is the traffic impediment, in response to the processor determining that the maximum speed is below the speed threshold.

According to several aspects of the present disclosure, a computer of a system for an ego vehicle includes one or more processors electronically connected to a longitudinal control submodule, a lateral control submodule, one or more input devices, and one or more notification devices. The computer further includes a non-transitory computer readable storage medium (CRM) storing instructions, such that the processor is programmed to receive an input signal from the input device, with the input signal being associated with a remote vehicle. The processor is further programmed to determine that the remote vehicle is a traffic impediment based on the input signal. The processor is further programmed to determine a speed profile of the remote vehicle based on the input signal. The processor is further programmed to determine a predicted slowdown event associated with the traffic impediment and the speed profile based on the input signal. The processor is further programmed to generate an actuation signal, in response to the processor determining the speed profile, the traffic impediment, and the predicted slowdown event. The notification device provides the notification to the user that the remote vehicle is the traffic impediment associated with the predicted slowdown event, in response to the notification device receiving the actuation signal from the processor.

In one aspect, the longitudinal control submodule controls a propulsion actuation device and/or a braking actuation device to enable the ego vehicle to pass the remote vehicle, in response to the longitudinal control submodule receiving the actuation signal from the processor. The lateral control submodule controls a steering actuation device to enable the ego vehicle to pass the remote vehicle, in response to the lateral control submodule receiving the actuation signal from the processor.

In another aspect, the processor is further programmed to determine a classification of the remote vehicle, in response to the processor receiving the input signal from the input device. The processor is further programmed to compare the classification of the remote vehicle to a lookup table including a plurality of predetermined classifications and a plurality of associated empirical speed profiles, in response to the processor determining the classification of the remote vehicle. The processor is further programmed to determine the speed profile of the remote vehicle, in response to the processor identifying the classification of the remote vehicle in the lookup table. The processor is further programmed to determine one or more surrounding vehicles, in response to the processor receiving the input signal from the input device, where the remote vehicle and the surrounding vehicle are located in a common region and have a common make, a common model, a common model year, a common engine type, and/or a common engine size. The processor is further programmed to determine a surrounding speed profile of the surrounding vehicle and define the speed profile of the remote vehicle as the surrounding speed profile.

In another aspect, the processor is further programmed to determine a target lane to be navigated by the ego vehicle to enable the ego vehicle to pass the remote vehicle. The processor is further programmed to determine an obstruction level associated with the target lane, in response to the processor receiving the input signal from the input device. The processor is further programmed to compare the obstruction level to a predetermined obstruction threshold. The processor is further programmed to determine that the target lane is free of an obstruction, in response to the processor determining that the obstruction level is below the predetermined obstruction threshold. The processor is further programmed to generate the actuation signal, in further response to the processor determining that the target lane is free of the obstruction. The processor is further programmed to determine that the target lane is not free of an obstruction, in response to the processor determining that the obstruction level is not below the predetermined obstruction threshold. The processor is further programmed to refrain from generating the actuation signal, in response to the processor determining that the target lane is not free of the obstruction.

In another aspect, the processor is further programmed to determine an upcoming turn for the ego vehicle and an associated closing distance between the upcoming turn and a current location of the remote vehicle. The processor is further programmed to compare the associated closing distance to a closing distance threshold. The processor is further programmed to generate the actuation signal, in response to the processor determining that the associated closing distance is above the closing distance threshold. The processor is further programmed to refrain from generating the actuation signal, in response to the processor determining that the associated closing distance is not above the closing distance threshold.

According to several aspects of the present disclosure, a method of operating an ego vehicle includes generating, using one or more input devices, an input signal associated with a remote vehicle. The method further includes receiving, using a processor of a computer, the input signal from the at least one input device. The method further includes determining, using the processor, that the remote vehicle is a traffic impediment based on the input signal. The method further includes determining, using the processor, a speed profile of the remote vehicle based on the input signal. The method further includes determining, using the processor, a predicted slowdown event based on the input signal. The method further includes generating, using the processor, an actuation signal in response to the processor determining the speed profile, the traffic impediment, and the predicted slowdown event. The method further includes providing, using a notification device, a notification to a user that the remote vehicle is the traffic impediment associated with the predicted slowdown event in response to the notification device receiving the actuation signal from the processor.

In one aspect, the method further includes the controlling, using a longitudinal control submodule of the system, a propulsion actuation device and/or a braking actuation device to enable the ego vehicle to pass the remote vehicle in response to the longitudinal control submodule receiving the actuation signal from the processor. The method further includes controlling, using the lateral control submodule, the steering actuation device to enable the ego vehicle to pass the remote vehicle in response to the lateral control submodule receiving the actuation signal from the processor.

In another aspect, the method further includes determining, using the processor, a classification of the remote vehicle in response to the processor receiving the input signal from the input device. The method further includes comparing, using the processor, the classification of the remote vehicle to a lookup table having a plurality of predetermined classifications and a plurality of associated empirical speed profiles in response to the processor determining the classification of the remote vehicle. The method further includes determining, using the processor, the speed profile of the remote vehicle in response to the processor identifying the classification of the remote vehicle in the lookup table. The method further includes determining, using the processor, one or more surrounding vehicles in response to the processor receiving the input signal from the input device, where the remote vehicle and the surrounding vehicle are located in a common region and have at least one of a common make, a common model, a common model year, a common engine type, and/or a common engine size. The method further includes determining, using the processor, a surrounding speed profile of the surrounding vehicle. The method further includes defining, using the processor, the speed profile of the remote vehicle as the surrounding speed profile of the surrounding vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
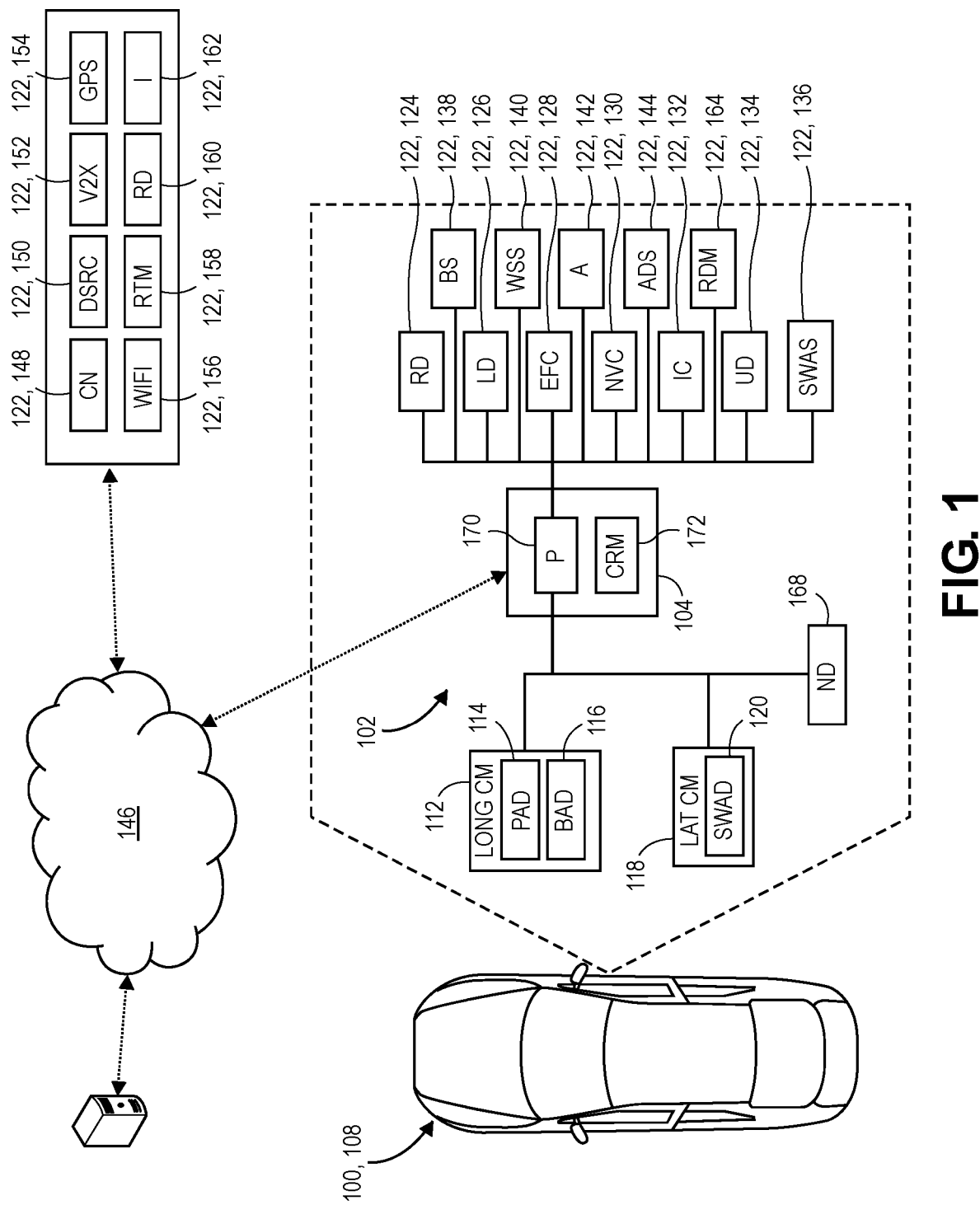
FIG. 1 is a schematic view of one example of an ego vehicle having a system including a computer for determining a predicted slowdown event associated with a remote vehicle, with the system further including a longitudinal control module and a lateral control module for enabling the ego vehicle to pass the remote vehicle.
Figure 2:
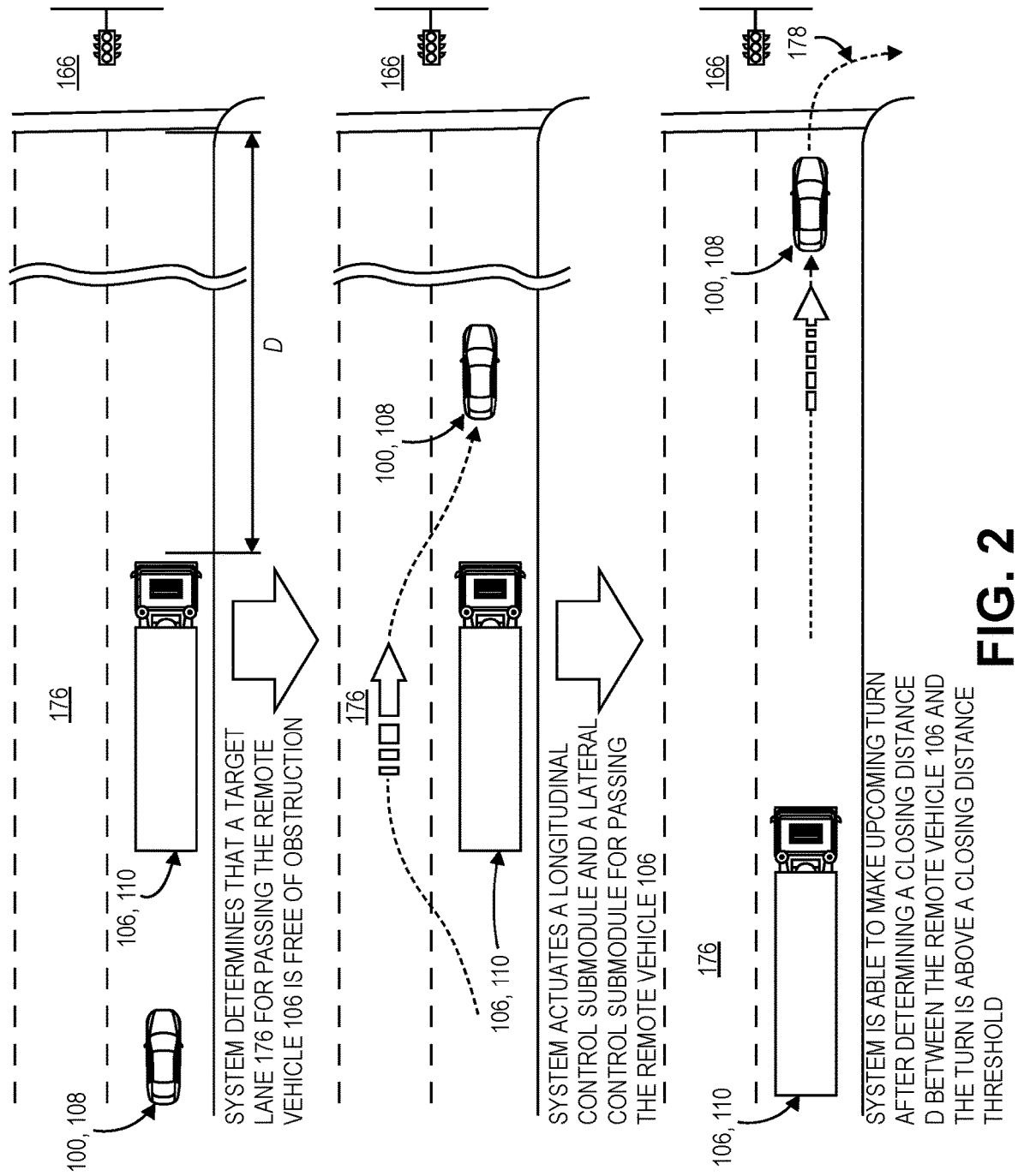
FIG. 2 is a schematic view of the ego vehicle of FIG. 1, illustrating the system enabling the ego vehicle to pass the remote vehicle in response to the system determining that a closing distance between an upcoming turn and the remote vehicle is not above a closing distance threshold.

The present disclosure describes one example of an ego vehicle 100 (FIG. 1) having a system 102 (system) with a computer 104, which determines a predicted slowdown event associated with a remote vehicle 106 that is located upstream of the ego vehicle 100, such that the ego vehicle 100 may pass the remote vehicle 106 (FIG. 2). Non-limiting examples of the ego vehicle 100 and/or the remote vehicle 106 (e.g., a sedan 108, a light duty truck, a heavy duty truck, a sport utility vehicle, a van, a motor home, a passenger bus, a commercial truck 110, a waste collection vehicle, a utility vehicle, a delivery vehicle, an emergency vehicle, etc.) may include autonomous vehicles, semi-autonomous vehicles, or a non-autonomous (manual) vehicles with associated propulsion systems (e.g., an internal combustion engine and/or an electric motor, hydrogen fuel cells, etc.). As a result of the ego vehicle 100 passing the remote vehicle 106, the ego vehicle 100 may decrease travel time, which may in turn decrease the consumption of vehicle resources (e.g., fuel resources, battery resources, processing resources, and/or memory resources) and/or network resources (e.g., time domain resources and/or frequency domain resources) used to operate the ego vehicle among other examples.

Referring to FIG. 1, one non-limiting example of the ego vehicle 100 is the autonomous vehicle, which includes a longitudinal control submodule 112 for controlling a propulsion actuation device 114 and/or a braking actuation device 116. The ego vehicle 100 may further include a lateral control submodule 118 for controlling a steering actuation device 120 of the ego vehicle 100. In other non-limiting examples, the ego vehicle is a semi-autonomous vehicle or a non-autonomous vehicle with an accelerator, a brake, and a steering wheel that are manually operated by a driver.

The ego vehicle 100 further includes the system 102, which has one or more input devices 122. Each input device 122 is configured to generate an input signal associated with the remote vehicle 106. More specifically, the input signal may be indicative of data (e.g., an absolute real-time speed, an absolute real-time heading, a relative real-time speed, a relative real-time heading, an average acceleration, an estimated weight, an average speed, a maximum speed, etc.) associated with the ego vehicle 100 and/or the remote vehicle 106. The input signal may be further indicative of data associated with a road geometry and a Vulnerable Road User (VRU) (e.g., a pedestrian; a roadway worker; a person operating a wheelchair or other personal mobility device, whether motorized or not; a person operating an electric scooter or similar; and a person operating a bicycle or other nonmotorized means of transportation).

Non-limiting examples of the input devices 122 may include multiple on-board devices mounted to the ego vehicle 100 for generating the input signal associated with movement of the ego vehicle 100, the remote vehicle 106, and/or VRUs (e.g., a radar device 124, a lidar device 126, an externally-facing camera 128, a night-vision camera 130, an infrared camera 132, an ultrasonic device 134, a steering wheel angle sensor 136, a brake sensor 138, a wheel speed sensor 140, an accelerometer 142, and/or an Automated Driving System 144 (ADS), among other examples). Non-limiting examples of the input device 122 may further include off-board devices in the data and communication network 146 (e.g., a cellular network 148, a Dedicated Short-Range Communications (DSRC) network 150, a Vehicle-To-Infrastructure (V2X) network 152, a Global Positioning Satellite (GPS) network 154, a Wi-Fi network 156, a road traffic monitoring network 158, a road database 160, an Internet network 162, among other examples). However, it is contemplated that the input device may include other suitable driver monitoring devices, on-board devices, or off-board devices. It is contemplated that the input signal may be indicative of other suitable parameters of a user (e.g., a vehicle occupant such as a driver and/or a passenger, an operator located remotely from the vehicle, etc.), the ego vehicle, the remote vehicle, road geometry, and VRUs among other examples.

The input devices 122 may further include a road detection module 164 for generating a road signal. In this non-limiting example, the road detection module 164 may include the radar device 124, the lidar device 126, the externally-facing camera 128, the night-vision camera 130, the infrared camera 132, the ultrasonic device 134, the cellular network 148, the DSRC network 150, the V2X network 152, the GPS network 154, the Wi-Fi network 156, the road traffic monitoring network 158, the road database 160, and/or the Internet network 162 among other examples.

The road signal may be indicative of the road geometry in the form of: an intersection 166 (FIG. 2) located downstream of the remote vehicle 106; a highway onramp located downstream of the remote vehicle 106; a highway exit ramp located downstream of the remote vehicle 106; a traffic control device located downstream of the remote vehicle 106; a stop sign located downstream of the remote vehicle 106; a bus stop located downstream of the remote vehicle 106; a mail box located downstream of the remote vehicle 106; a business delivery entrance located downstream of the remote vehicle 106; a train crossing located downstream of the remote vehicle 106; and/or a curbside garbage pickup located downstream of the remote vehicle 106, among other examples.

The system 102 further includes a notification device 168 (e.g., a Human Machine Interface (HMI), a speaker, a display device such as an Augmented Reality Head Up Display (ARHUD), etc.) for providing a notification (e.g., a displayed message, a spoken announcement, and/or a displayed symbol associated with the notification "Pass Traffic Impediment" and the like) to the user to indicate that the remote vehicle 106 is a traffic impediment associated with a predicted slowdown event.

The system 102 further includes a computer 104 including one or more processors 170 electronically connected to the longitudinal control submodule 112, the lateral control submodule 118, the input devices 122, and the notification device 168. The computer 104 further includes a non-transitory computer readable storage medium (CRM) 172 storing instructions, such that the processor 170 is programmed to receive the input signal from the at least one input device 122.

The processor 170 is further programmed to determine a speed profile of the remote vehicle 106 based on the input signal. More specifically, in one non-limiting example, the processor 170 may be further programmed to determine a classification of the remote vehicle 106 (e.g., a sedan 108, a light duty truck, a heavy duty truck, a sport utility vehicle, a van, a motor home, a passenger bus, a commercial truck 110, a waste collection vehicle, a utility vehicle, a delivery vehicle, an emergency vehicle, etc.), in response to the processor 170 receiving the input signal from the input device 122. The processor 170 is further programmed to compare the classification of the remote vehicle 106 to a lookup table (e.g., in a remote database, etc.) including a plurality of predetermined classifications and a plurality of associated empirical speed profiles (e.g., an average acceleration, an estimated weight, an average speed, and/or a maximum speed associated with each classification; a predicted frequency of stops such as a plurality of bus stop locations associated with the passenger bus, a plurality of curbside garbage pickups associated with the waste collection vehicle, etc.), in response to the processor 170 determining the classification of the remote vehicle 106.

Figure 3:
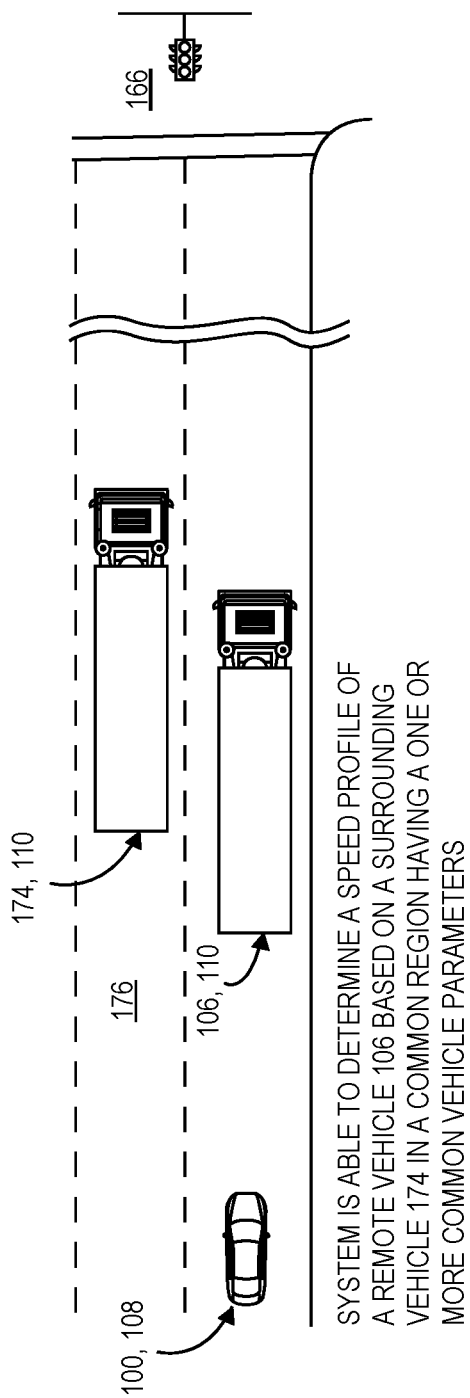
FIG. 3 is a schematic view of the ego vehicle of FIG. 1, illustrating the system determining a speed profile of a remote vehicle based on a known speed profile of a surrounding vehicle, with the remote vehicle and the surrounding vehicle located in a common region and having a common make, model, model year, engine type, and/or engine size.

In another non-limiting example, the processor 170 may be further programmed to determine one or more surrounding vehicles 174 (FIG. 3), in response to the processor 170 receiving the input signal from the input device 122, where the remote vehicle 106 and the surrounding vehicle 174 are located in a common region and have a common make, a common model, a common model year, a common engine type, and/or a common engine size among other examples. The processor 170 may be further programmed to determine a surrounding speed profile of the surrounding vehicle 174 and define the speed profile of the remote vehicle 106 as the surrounding speed profile of the surrounding vehicle 174.

The processor 170 is further programmed to determine that the remote vehicle 106 is a traffic impediment based on the input signal. In one non-limiting example, the processor 170 is further programmed to compare the predicted frequency of stops for the remote vehicle 106 to a stop frequency threshold and determine that the remote vehicle 106 is the traffic impediment, in response to the processor 170 determining that the predicted frequency of stops is above the stop frequency threshold. The processor 170 is further programmed to compare the average acceleration of the remote vehicle 106 to an acceleration threshold and determine that the remote vehicle 106 is the traffic impediment, in response to the processor 170 determining that the average acceleration is below the acceleration threshold. The processor 170 is further programmed to compare the estimated weight of the remote vehicle 106 to a predetermined weight threshold and determine that the remote vehicle 106 is the traffic impediment, in response to the processor determining that the estimated weight is above the predetermined weight threshold. The processor is further programmed to compare the average speed of the remote vehicle 106 to a predetermined average speed threshold and determine that the remote vehicle 106 is the traffic impediment, in response to the processor 170 determining that the average speed is below the predetermined average speed threshold. The processor 170 is further programmed to compare the maximum speed of the remote vehicle 106 to a speed threshold and determine that the remote vehicle 106 is the traffic impediment, in response to the processor 170 determining that the maximum speed is below the speed threshold. It is contemplated that the processor may determine that the remote vehicle is the traffic impediment based on the input signal associated with any combination of the above parameters, other suitable parameters, and associated thresholds.

The processor 170 is further programmed to determine a predicted slowdown event associated with the traffic impediment and the speed profile based on the input signal. More specifically, in one non-limiting example, the processor 170 is further programmed to determine the predicted slowdown event, in response to the processor 170 determining that the remote vehicle 106 is the traffic impediment and further based on the input signal being associated with at least one of: the intersection 166 (FIG. 2) located downstream of the remote vehicle within a predetermined distance D of the remote vehicle 106; the highway onramp located downstream of the remote vehicle 106 within a predetermined distance of the remote vehicle 106; the highway exit ramp located downstream of the remote vehicle 106 within a predetermined distance of the remote vehicle 106; the traffic control device located downstream of the remote vehicle 106 within a predetermined distance of the remote vehicle 106; the stop sign located downstream of the remote vehicle 106 within a predetermined distance of the remote vehicle 106; the bus stop located downstream of the remote vehicle 106 within a predetermined distance of the remote vehicle 106; the mail box located downstream of the remote vehicle 106 within a predetermined distance of the remote vehicle 106; the business delivery entrance located downstream of the remote vehicle 106 within a predetermined distance of the remote vehicle 106; the train crossing located downstream of the remote vehicle 106 within a predetermined distance of the remote vehicle 106; and the curbside garbage pickup located downstream of the remote vehicle 106 within a predetermined distance of the remote vehicle 106. It is contemplated that the processor may be programmed to determine the predicted slowdown event based on the input signal being associated with any combination of these parameters, other suitable parameters, and associated thresholds.

The processor 170 is further programmed to generate an actuation signal, in response to the processor 170 determining the speed profile, the traffic impediment, and the predicted slowdown event. More specifically, in this non-limiting example, the processor 170 is further programmed to determine a target lane 176 (FIG. 2) to be navigated by the ego vehicle 100 for passing the remote vehicle 106, in response to the processor 170 receiving the input signal. The processor 170 is further programmed to determine an obstruction level associated with the target lane 176, in response to the processor 170 receiving the input signal from the input device 122. The processor 170 is further programmed to compare the obstruction level to a predetermined obstruction threshold. The processor 170 is further programmed to determine that the target lane 176 is free of an obstruction, in response to the processor 170 determining that the obstruction level is below the predetermined obstruction threshold. The processor 170 is further programmed to generate the actuation signal, in further response to the processor 170 determining that the target lane 176 is free of the obstruction. The processor 170 is further programmed to determine that the target lane 176 is not free of an obstruction, in response to the processor 170 determining that the obstruction level is not below the predetermined obstruction threshold. The processor 170 is further programmed to refrain from generating the actuation signal, in response to the processor 170 determining that the target lane 176 is not free of the obstruction.

The processor 170 is further programmed to determine an upcoming turn 178 for the ego vehicle 100 and an associated closing distance D between the upcoming turn 178 and a current location of the remote vehicle 106. The processor 170 is further programmed to compare the associated closing distance D to a closing distance threshold. The processor 170 is further programmed to generate the actuation signal, in further response to the processor 170 determining that the associated closing distance D is above the closing distance threshold. The processor 170 is further programmed to refrain from generating the actuation signal, in response to the processor 170 determining that the associated closing distance D is not above the closing distance threshold.

The notification device 168 provides the notification to the user to indicate the predicted slowdown event, in response to the notification device 168 receiving the actuation signal from the processor 170. The longitudinal control submodule 112 controls the propulsion actuation device 114 and/or the braking actuation device 116 to enable the ego vehicle 100 to pass the remote vehicle 106, in response to the longitudinal control submodule 112 receiving the actuation signal from the processor 170. The lateral control submodule 118 controls the steering actuation device 120 to enable the ego vehicle 100 to pass the remote vehicle 106, in response to the lateral control submodule 118 receiving the actuation signal from the processor 170.

Figure 4:
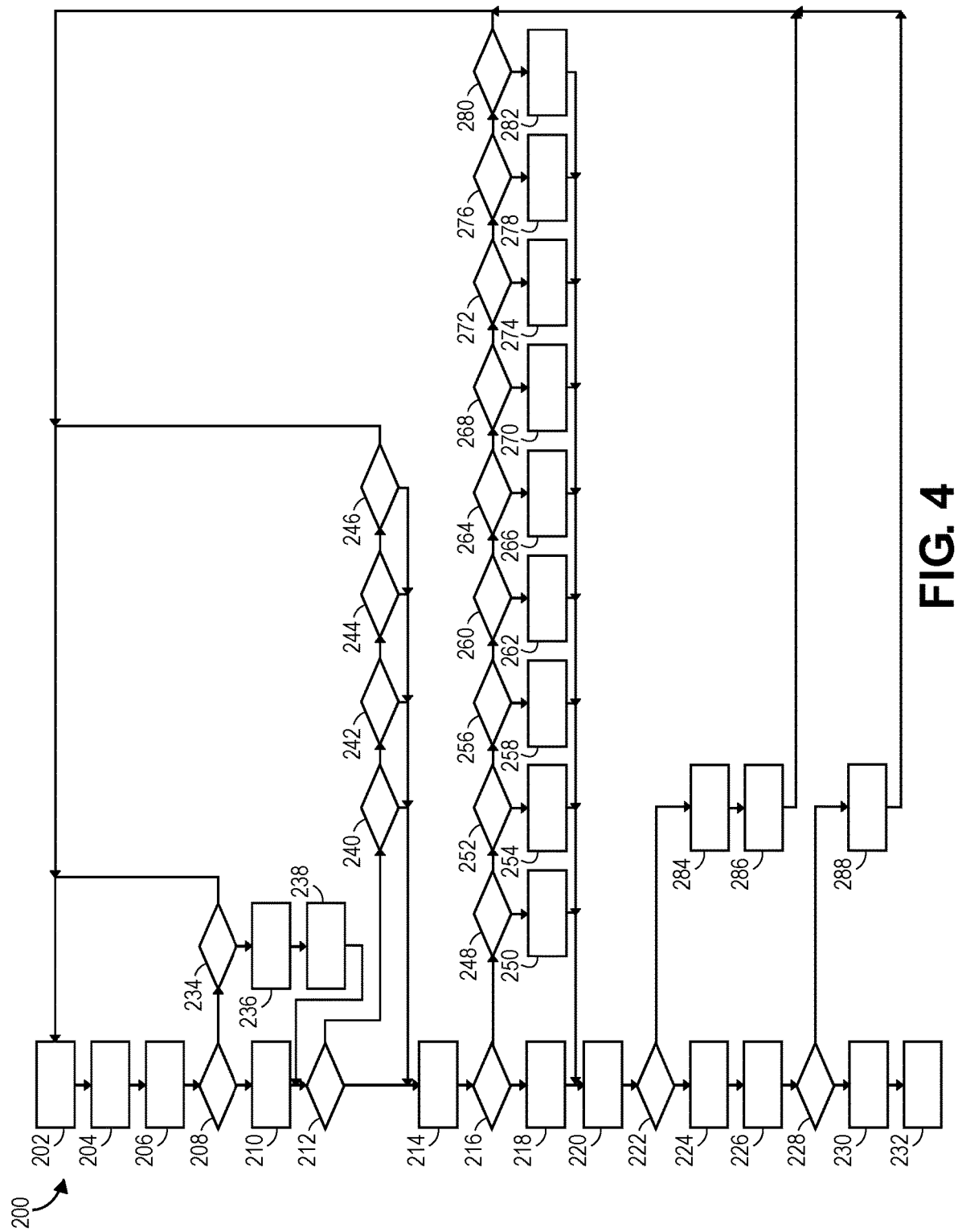
FIG. 4 is a flow chart of one example of a method of operating the ego vehicle of FIG. 1.

Referring to FIG. 4, a method 200 is provided for operating the system 102 of FIG. 1. The method 200 begins at block 202 with generating, using the input device 122, the input signal associated with the remote vehicle 106. The method 200 proceeds to block 204.

At block 204, the method 200 further includes receiving, using the processor 170 of the computer 104, the input signal from the input device 122. The method 200 proceeds to block 206.

At block 206, the method 200 further includes determining, using the processor 170, the speed profile of the remote vehicle 106 based on the input signal. In this non-limiting example, the speed profile may be determined by blocks 206 through 210 and/or blocks 234 through 238 More specifically, the method 200 includes determining, using the processor 170, the classification of the remote vehicle 106 in response to the processor 170 receiving the input signal from the input device 122. The method 200 proceeds to block 208.

At block 208, the method 200 further includes comparing, using the processor 170, the classification of the remote vehicle 106 to the lookup table, which includes the predetermined classifications and the associated empirical speed profiles in response to the processor 170 determining the classification of the remote vehicle. The method 200 proceeds to block 210, in response to the processor 170 identifying a predetermined classification in the lookup table that matches the classification of the remote vehicle 106. The method 200 proceeds to block 234, in response to the processor 170 not identifying a predetermined classification in the lookup table that matches the classification of the remote vehicle 106.

At block 210, the method 200 further includes determining, using the processor 170, the speed profile of the remote vehicle 106 by defining the speed profile of the remote vehicle 106 as the predetermined speed profile of the predetermined classification that matches the classification of the remote vehicle 106. The method 200 proceeds to block 212.

At block 212 the method 200 further includes determining, using the processor 170, that the remote vehicle 106 is the traffic impediment based on the input signal. The processor 170 may determine that the remote vehicle 106 is the traffic impediment via blocks 212, 214, and 242 through 246. More specifically, in this non-limiting example, the method 200 includes comparing, using the processor 170, the predicted frequency of stops for the remote vehicle 106 to the stop frequency threshold. The method 200 proceeds to block 214, in response to the processor 170 determining that the predicted frequency of stops is above the stop frequency threshold. The method 200 proceeds to block 240, in response to the processor 170 determining that the predicted frequency of stops is not above the stop frequency threshold.

At block 214, the method 200 further includes determining, using the processor 170, that the remote vehicle 106 is the traffic impediment. The method 200 proceeds to block 216.

At block 216, the method 200 further includes determining, using the processor 170, the predicted slowdown event (e.g., at a location downstream of a current location of the remote vehicle 106, etc.), in response to the processor 170 determining that the remote vehicle 106 is the traffic impediment and further based on the input signal being associated one or more conditions associated with blocks 216, 218, and 248 through 282. The method 200 may include comparing, using the processor 170, an intersection value (e.g., based on the input signal) to an intersection threshold. The method 200 proceeds to block 218, in response to the processor 170 determining that the intersection value is above the intersection threshold. The method 200 proceeds to block 248, in response to the processor 170 determining that the intersection value is not above the intersection threshold.

At block 218, the method 200 includes determining, using the processor 170, that the intersection 166 (FIG. 2) is located downstream of the remote vehicle 106 within the predetermined distance D of the remote vehicle 106 and is associated with the predicted slowdown event. The method 200 proceeds to block 220.

At block 220, the method 200 further includes determining, using the processor 170, the target lane 176 (FIG. 2) to be navigated by the ego vehicle 100 for passing the remote vehicle 106, in response to the processor 170 receiving the input signal. The method 200 proceeds to block 222.

At block 222, the method 200 further includes determining, using the processor 170, the obstruction level associated with the target lane 176, in response to the processor 170 receiving the input signal from the input device 122. The method 200 further includes comparing, using the processor 170, the obstruction level to the predetermined obstruction threshold. The method 200 proceeds to block 224, in response to the processor 170 determining that the obstruction level is below the predetermined obstruction threshold. The method 200 proceeds to block 284, in response to the processor 170 determining that the obstruction level is not below the predetermined obstruction threshold.

At block 224, the method 200 further includes determining, using the processor 170, that the target lane 176 is free of an obstruction, in response to the processor 170 determining that the obstruction level is below the predetermined obstruction threshold. The method 200 proceeds to block 226.

At block 226, the method 200 further includes determining, using the processor 170, the upcoming turn 178 for the ego vehicle 100 and the associated closing distance D between the upcoming turn 178 and a current location of the remote vehicle 106. The method 200 proceeds to block 228.

At block 228, the method 200 further includes comparing, using the processor 170, the associated closing distance D to a closing distance threshold. The method 200 proceeds to block 230, in response to the processor 170 determining that the closing distance D is above the closing distance threshold. The method 200 proceeds to block 288, in response to the processor 170 determining that the closing distance D is not above the closing distance threshold.

At block 230, the method 200 further includes generating, using the processor 170, the actuation signal, in response to the processor 170 determining the speed profile, the traffic impediment, and the predicted slowdown event, and in further response to the processor 170 determining that the target lane 176 is free of the obstruction and in further response to the processor 170 determining that the associated closing distance D is above the closing distance threshold. The method 200 proceeds to block 232.

At block 232, the method 200 further includes providing, using notification device 168, the notification to the user to indicate the predicted slowdown event in response to the notification device receiving the actuation signal from the processor 170. The longitudinal control submodule 112 controls the propulsion actuation device 114 and/or the braking actuation device 116 to enable the ego vehicle 100 to pass the remote vehicle 106, in response to the longitudinal control submodule 112 receiving the actuation signal from the processor 170. The lateral control submodule 118 controls the steering actuation device 120 to enable the ego vehicle 100 to pass the remote vehicle 106, in response to the lateral control submodule 118 receiving the actuation signal from the processor 170. The method 200 proceeds to block 234.

At block 234, the method 200 further includes determining, using the processor 170, a presence of the surrounding vehicle 174 (FIG. 3), in response to the processor 170 receiving the input signal from the input device 122, where the remote vehicle 106 and the surrounding vehicle 174 are located in the common region and have the common make, the common model, the common model year, and/or the common engine type, and/or the common engine size. The method 200 proceeds to block 236, in response to the processor 170 determining that the remote vehicle 106 and the surrounding vehicle 174 are located in the common region and have the common make, the common model, the common model year, the common engine type, and/or the common engine size. The method 200 returns to block 202, in response to the processor 170 not determining that the remote vehicle 106 and the surrounding vehicle 174 are located in the common region and have the common make, the common model, the common model year, the common engine type, and/or the common engine size.

At block 236, the method 200 further includes determining, using the processor 170, the surrounding speed profile of the surrounding vehicle 174 via for example the lookup table. The method 200 proceeds to block 238.

At block 238, the method 200 further includes defining, using the processor 170, the speed profile of the remote vehicle 106 as the surrounding speed profile of the surrounding vehicle 174. The method 200 proceeds to block 212.

At block 240, the method 200 further includes comparing, using the processor 170, the average acceleration of the remote vehicle 106 to an acceleration threshold. The method 200 proceeds to block 214, in response to the processor 170 determining that the average acceleration is below the acceleration threshold. The method 200 proceeds to block 242, in response to the processor 170 determining that the average acceleration is not below the acceleration threshold.

At block 242, the method 200 further includes comparing, using the processor 170, the estimated weight of the remote vehicle 106 to a predetermined weight threshold. The method proceeds to block 214, in response to the processor 170 determining that the estimated weight is above the predetermined weight threshold. The method proceeds to block 244, in response to the processor 170 determining that the estimated weight is not above the predetermined weight threshold.

At block 244, the method 200 further includes comparing, using the processor 170, the average speed of the remote vehicle 106 to the predetermined average speed threshold. The method 200 proceeds to block 214, in response to the processor 170 determining that the average speed is below the predetermined average speed threshold. The method 200 proceeds to block 246, in response to the processor 170 determining that the average speed is not below the predetermined average speed threshold.

At block 246, the method 200 further includes comparing the maximum speed of the remote vehicle 106 to a speed threshold. The method 200 proceeds to block 214, in response to the processor 170 determining that the maximum speed is below the speed threshold. The method 200 returns to block 202, in response to the processor 170 determining that the maximum speed is not below the speed threshold. It is contemplated that the processor may determine that the remote vehicle is the traffic impediment based on the input signal associated with any combination of the above parameters, other suitable parameters, and associated thresholds.

At block 248, the method 200 further includes comparing, using the processor 170, a highway onramp value (e.g., based on the input signal) to a predetermined highway onramp threshold. The method 200 proceeds to block 250, in response to the processor 170 determining that the highway onramp value is above the predetermined highway onramp threshold. The method 200 proceeds to block 252, in response to the processor 170 determining that the highway onramp value is not above the predetermined highway onramp threshold.

At block 250, the method 200 further includes determining, using the processor 170, that the highway onramp is located downstream of the remote vehicle 106 within the predetermined distance D of the remote vehicle 106 and is associated with the predicted slowdown event. The method 200 proceeds to block 220.

At block 252, the method 200 further includes comparing, using the processor 170, a highway exit ramp value (e.g., based on the input signal) to a predetermined highway exit ramp threshold. The method 200 proceeds to block 254, in response to the processor 170 determining that the highway exit ramp value is above the predetermined highway exit ramp threshold. The method 200 proceeds to block 256, in response to the processor 170 determining that the highway exit ramp value is not above the predetermined highway exit ramp threshold.

At block 254, the method 200 further includes determining, using the processor 170, that the highway exit ramp is located downstream of the remote vehicle 106 within the predetermined distance D of the remote vehicle 106 and is associated with the predicted slowdown event. The method 200 proceeds to block 220.

At block 256, the method 200 further includes comparing, using the processor 170, a traffic control device value (e.g., based on the input signal) to a predetermined traffic control device threshold. The method 200 proceeds to block 258, in response to the processor 170 determining that the traffic control device value is above the traffic control device threshold. The method 200 proceeds to block 260, in response to the processor 170 determining that the traffic control device value is not above the predetermined traffic control device threshold.

At block 258, the method 200 further includes determining, using the processor 170, that the traffic control device is located downstream of the remote vehicle 106 within the predetermined distance D of the remote vehicle 106 and is associated with the predicted slowdown event. The method 200 proceeds to block 220.

At block 260, the method 200 further includes comparing, using the processor 170, a stop sign value (e.g., based on the input signal) to a predetermined stop sign threshold. The method 200 proceeds to block 262, in response to the processor 170 determining that the stop sign value is above the stop sign threshold. The method 200 proceeds to block 264, in response to the processor 170 determining that the stop sign value is not above the predetermined stop sign threshold.

At block 262, the method 200 further includes determining, using the processor 170, that the stop sign is located downstream of the remote vehicle 106 within the predetermined distance D of the remote vehicle 106 and is associated with the predicted slowdown event. The method 200 proceeds to block 220.

At block 264, the method 200 further includes comparing, using the processor 170, a bus stop value (e.g., based on the input signal) to a predetermined bus stop threshold. The method 200 proceeds to block 266, in response to the processor 170 determining that the bus stop value is above the stop sign threshold. The method 200 proceeds to block 268, in response to the processor 170 determining that the bus stop value is not above the predetermined bus stop threshold.

At block 266, the method 200 further includes determining, using the processor 170, that the bus stop is located downstream of the remote vehicle 106 within the predetermined distance D of the remote vehicle 106 and is associated with the predicted slowdown event. The method 200 proceeds to block 220.

At block 268, the method 200 further includes comparing, using the processor 170, a mail box value (e.g., based on the input signal) to a predetermined mail box threshold. The method 200 proceeds to block 270, in response to the processor 170 determining that the mail box value is above the mail box threshold. The method 200 proceeds to block 272, in response to the processor 170 determining that the mail box value is not above the predetermined mail box threshold.

At block 270, the method 200 further includes determining, using the processor 170, that the mail box is located downstream of the remote vehicle 106 within the predetermined distance D of the remote vehicle 106 and is associated with the predicted slowdown event. The method 200 proceeds to block 220.

At block 272, the method 200 further includes comparing, using the processor 170, a business delivery entrance value (e.g., based on the input signal) to a predetermined business delivery entrance threshold. The method 200 proceeds to block 274, in response to the processor 170 determining that the business delivery entrance value is above the business delivery entrance threshold. The method 200 proceeds to block 276, in response to the processor 170 determining that the business delivery entrance value is not above the predetermined business delivery entrance threshold.

At block 274, the method 200 further includes determining, using the processor 170, that the business delivery entrance is located downstream of the remote vehicle 106 within the predetermined distance D of the remote vehicle 106 and is associated with the predicted slowdown event. The method 200 proceeds to block 220.

At block 276, the method 200 further includes comparing, using the processor 170, a train crossing value (e.g., based on the input signal) to a predetermined train crossing threshold. The method 200 proceeds to block 278, in response to the processor 170 determining that the train crossing value is above the train crossing threshold. The method 200 proceeds to block 280, in response to the processor 170 determining that the train crossing value is not above the predetermined train crossing threshold.

At block 278, the method 200 further includes determining, using the processor 170, that the train crossing is located downstream of the remote vehicle 106 within the predetermined distance D of the remote vehicle 106 and is associated with the predicted slowdown event. The method 200 proceeds to block 220.

At block 280, the method 200 further includes comparing, using the processor 170, a curbside garbage pickup value (e.g., based on the input signal) to a predetermined curbside garbage pickup threshold. The method 200 proceeds to block 282, in response to the processor 170 determining that the curbside garbage pickup value is above the curbside garbage pickup threshold. The method 200 returns to block 202, in response to the processor 170 determining that the curbside garbage pickup value is not above the predetermined curbside garbage pickup threshold.

At block 282, the method 200 further includes determining, using the processor 170, that the curbside garbage pickup is located downstream of the remote vehicle 106 within the predetermined distance D of the remote vehicle 106 and is associated with the predicted slowdown event. The method 200 proceeds to block 220.

At block 284, the method 200 further includes determining, using the processor 170, that the target lane 176 is not free of an obstruction, in response to the processor 170 determining that the obstruction level is not below the predetermined obstruction threshold. The method 200 proceeds to block 286.

At block 286, the method 200 further includes refraining from, using the processor 170, generating the actuation signal, in response to the processor 170 determining that the target lane 176 is not free of the obstruction. The method 200 returns to block 202.

At block 288, the method 200 further includes refraining from, using the processor 170, generating the actuation signal, in response to the processor 170 determining that the associated closing distance D is not above the closing distance threshold. The method 200 returns to block 202.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor may be communicatively coupled to, e.g., via the vehicle communications module, more than one local processor, e.g., included in electronic processor units (ECUs) or the like included in the ego vehicle 100 for monitoring and/or controlling various vehicle components. The processor 170 is generally arranged for communications on the vehicle communications module via an internal wired and/or wireless network, e.g., a bus or the like in the ego vehicle 100, such as a controller area network (CAN) or the like, and/or other wired and/or wireless mechanisms. Via the vehicle communications module, the processor 170 may transmit messages to various devices in the ego vehicle 100 and/or receive messages from the various devices, e.g., vehicle sensors, actuators, vehicle components, a human machine interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An ego vehicle comprising:
  a longitudinal control submodule for controlling at least one of a propulsion actuation device and a braking actuation device of the ego vehicle;
  a lateral control submodule for controlling a steering actuation device of the ego vehicle; and
  a system comprising:
    at least one input device for generating an input signal associated with a remote vehicle;
    at least one notification device for providing a notification to a user that the remote vehicle is a traffic impediment associated with a predicted slowdown event; and
  a computer comprising at least one processor electronically connected to the longitudinal control submodule, the lateral control submodule, the at least one input device, and the at least one notification device, and the computer further comprising a non-transitory computer readable storage medium (CRM) storing instructions such that the at least one processor is programmed to:
    receive the input signal from the at least one input device;
    determine a speed profile of the remote vehicle based on the input signal;
    determine that the remote vehicle is a traffic impediment based on the input signal;
    determine a predicted slowdown event associated with the traffic impediment and the speed profile based on the input signal; and
    generate an actuation signal in response to the at least one processor determining the traffic impediment, the speed profile, and the predicted slowdown event; and
  where the at least one notification device provides the notification to the user that the remote vehicle is a traffic impediment associated with a predicted slowdown event in response to the at least one notification device receiving the actuation signal from the at least one processor,
  wherein the speed profile of the remote vehicle indicates a predicted frequency of stops, and the at least one processor is further programmed to:
    compare the predicted frequency of stops for the remote vehicle to a stop frequency threshold; and
    determine that the remote vehicle is the traffic impediment in response to the at least one processor determining that the predicted frequency of stops is above the stop frequency threshold,
  wherein the speed profile indicates an average acceleration of the remote vehicle, and the at least one processor is further programmed to:
    compare the average acceleration of the remote vehicle to an acceleration threshold; and
    determine that the remote vehicle is the traffic impediment in response to the at least one processor determining that the average acceleration is below the acceleration threshold,
  wherein the speed profile indicates an estimated weight of the remote vehicle, and the at least one processor is further programmed to:
    compare the estimated weight of the remote vehicle to a predetermined weight threshold; and
    determine that the remote vehicle is the traffic impediment in response to the at least one processor determining that the estimated weight is above the predetermined weight threshold, and
  wherein the speed profile indicates an average speed of the remote vehicle, and the at least one processor is further programmed to:
    compare the average speed of the remote vehicle to a predetermined average speed threshold; and determine that the remote vehicle is the traffic impediment in response to the at least one processor determining that the average speed is below the predetermined average speed threshold.

2. The ego vehicle of claim 1 wherein the longitudinal control submodule controls at least one of the propulsion actuation device and the braking actuation device to enable the ego vehicle to pass the remote vehicle in response to the longitudinal control submodule receiving the actuation signal from the at least one processor, and the lateral control submodule controls the steering actuation device to enable the ego vehicle to pass the remote vehicle in response to the lateral control submodule receiving the actuation signal from the at least one processor.

3. The ego vehicle of claim 2 wherein the at least one processor is further programmed to:
 determine a classification of the remote vehicle in response to the at least one processor receiving the input signal from the at least one input device;
 compare the classification of the remote vehicle to a lookup table comprising a plurality of predetermined classifications and a plurality of associated empirical speed profiles in response to the at least one processor determining the classification of the remote vehicle;
 determine the speed profile of the remote vehicle in response to the at least one processor comparing the classification of the remote vehicle to the lookup table.

4. The ego vehicle of claim 2 wherein the at least one processor is further programmed to:
 determine at least one surrounding vehicle in response to the at least one processor receiving the input signal from the at least one input device, where the remote vehicle and the at least one surrounding vehicle are located in a common region and have at least one of a common make, a common model, a common model year, a common engine type, and a common engine size;
 determine a surrounding speed profile of the at least one surrounding vehicle; and
 define the speed profile of the remote vehicle as the surrounding speed profile of the at least one surrounding vehicle.

5. The ego vehicle of claim 2 wherein the at least one processor is further programmed to determine the predicted slowdown event in response to the at least one processor determining that the remote vehicle is the traffic impediment and further based on the input signal being associated with at least one of:
 an intersection located downstream of the remote vehicle;
 a highway onramp located downstream of the remote vehicle;
 a highway exit ramp located downstream of the remote vehicle;
 a traffic control device located downstream of the remote vehicle;
 a stop sign located downstream of the remote vehicle;
 a bus stop located downstream of the remote vehicle;
 a mail box located downstream of the remote vehicle;
 a business delivery entrance located downstream of the remote vehicle;
 a train crossing located downstream of the remote vehicle; and
 a curbside garbage pickup located downstream of the remote vehicle.

6. The ego vehicle of claim 2 wherein the at least one processor is further programmed to:
 determine a target lane to be navigated by the ego vehicle for passing the remote vehicle in response to the processor receiving the input signal;
 determine an obstruction level associated with the target lane in response to the processor receiving the input signal from the input device;
 compare the obstruction level to a predetermined obstruction threshold;
 determine that the target lane is free of an obstruction in response to the at least one processor determining that the obstruction level is below the predetermined obstruction threshold;
 generate the actuation signal in further response to the at least one processor determining that the target lane is free of the obstruction;
 determine that the target lane is not free of an obstruction in response to the processor determining that the obstruction level is not below the predetermined obstruction threshold; and
 refrain from generating the actuation signal in response to the at least one processor determining that the target lane is not free of the obstruction.

7. The ego vehicle of claim 2 wherein the at least one processor is further programmed to:
 determine an upcoming turn for the ego vehicle and an associated closing distance between the upcoming turn and a current location of the remote vehicle;
 compare the associated closing distance to a closing distance threshold;
 generate the actuation signal in further response to the at least one processor determining that the associated closing distance is above the closing distance threshold; and
 refrain from generating the actuation signal in response to the at least one processor determining that the associated closing distance is not above the closing distance threshold.

8. The ego vehicle of claim 2 wherein the speed profile of the remote vehicle indicates a maximum speed of the remote vehicle, and the at least one processor is further programmed to:
 compare the maximum speed of the remote vehicle to a speed threshold; and
 determine that the remote vehicle is the traffic impediment in response to the at least one processor determining that the maximum speed is below the speed threshold.

9. A computer of a system for an ego vehicle, the computer comprising:
 at least one processor electronically connected to a longitudinal control submodule, a lateral control submodule, at least one input device, and at least one notification device of the system for the ego vehicle; and
 a non-transitory computer readable storage medium (CRM) storing instructions such that the at least one processor is programmed to:
  receive an input signal from the at least one input device, with the input signal being associated with a remote vehicle;
  determine a speed profile of the remote vehicle based on the input signal;
  determine that the remote vehicle is a traffic impediment based on the input signal;
  determine a predicted slowdown event associated with the traffic impediment and the speed profile based on the input signal; and generate an actuation signal in response to the at least one processor determining the traffic impediment, the speed profile, and the predicted slowdown event; and where the at least one notification device provides the notification to a user that the remote vehicle is a traffic impediment associated with a predicted slowdown event in response to the at least one notification device receiving the actuation signal from the at least one processor, wherein the speed profile of the remote vehicle indicates a predicted frequency of stops, and the at least one processor is further programmed to:
compare the predicted frequency of stops for the remote vehicle to a stop frequency threshold; and
determine that the remote vehicle is the traffic impediment in response to the at least one processor determining that the predicted frequency of stops is above the stop frequency threshold, wherein the speed profile indicates an average acceleration of the remote vehicle, and the at least one processor is further programmed to:
compare the average acceleration of the remote vehicle to an acceleration threshold; and
determine that the remote vehicle is the traffic impediment in response to the at least one processor determining that the average acceleration is below the acceleration threshold, wherein the speed profile indicates an estimated weight of the remote vehicle, and the at least one processor is further programmed to:
compare the estimated weight of the remote vehicle to a predetermined weight threshold; and
determine that the remote vehicle is the traffic impediment in response to the at least one processor determining that the estimated weight is above the predetermined weight threshold, and wherein the speed profile indicates an average speed of the remote vehicle, and the at least one processor is further programmed to:
compare the average speed of the remote vehicle to a predetermined average speed threshold; and
determine that the remote vehicle is the traffic impediment in response to the at least one processor determining that the average speed is below the predetermined average speed threshold.

10. The computer of claim 9 wherein the longitudinal control submodule controls at least one of a propulsion actuation device and a braking actuation device to enable the ego vehicle to pass the remote vehicle in response to the longitudinal control submodule receiving the actuation signal from the at least one processor, and the lateral control submodule controls a steering actuation device to enable the ego vehicle to pass the remote vehicle in response to the lateral control submodule receiving the actuation signal from the at least one processor.

11. The computer of claim 10 wherein the at least one processor is further programmed to:
determine a classification of the remote vehicle in response to the at least one processor receiving the input signal from the at least one input device;
compare the classification of the remote vehicle to a lookup table comprising a plurality of predetermined classifications and a plurality of associated empirical speed profiles in response to the at least one processor determining the classification of the remote vehicle;
determine the speed profile of the remote vehicle in response to the at least one processor comparing the classification of the remote vehicle to the lookup table;
determine at least one surrounding vehicle in response to the at least one processor receiving the input signal from the at least one input device, where the remote vehicle and the at least one surrounding vehicle are located in a common region and have at least one of a common make, a common model, a common model year, a common engine type, and a common engine size;
determine a surrounding speed profile of the at least one surrounding vehicle; and
define the speed profile of the remote vehicle as the surrounding speed profile of the at least one surrounding vehicle.

12. The computer of claim 10 wherein the at least one processor is further programmed to:
determine a target lane to be navigated by the ego vehicle for passing the remote vehicle in response to the processor receiving the input signal;
determine an obstruction level associated with the target lane in response to the processor receiving the input signal from the input device;
compare the obstruction level to a predetermined obstruction threshold;
determine that the target lane is free of an obstruction in response to the at least one processor determining that the obstruction level is below the predetermined obstruction threshold;
generate the actuation signal in further response to the at least one processor determining that the target lane is free of the obstruction;
determine that the target lane is not free of an obstruction in response to the processor determining that the obstruction level is not below the predetermined obstruction threshold; and
refrain from generating the actuation signal in response to the at least one processor determining that the target lane is not free of the obstruction.

13. The computer of claim 10 wherein the at least one processor is further programmed to:
determine an upcoming turn for the ego vehicle and an associated closing distance between the upcoming turn and a current location of the remote vehicle;
compare the associated closing distance to a closing distance threshold;
generate the actuation signal in further response to the at least one processor determining that the associated closing distance is above the closing distance threshold; and
refrain from generating the actuation signal in response to the at least one processor determining that the associated closing distance is not above the closing distance threshold.

14. A method of operating an ego vehicle having a system, the method comprising:
generating, using at least one input device, an input signal associated with a remote vehicle;
receiving, using at least one processor of a computer, the input signal from the at least one input device;
determining, using the at least one processor, a speed profile of the remote vehicle based on the input signal;
determining, using the at least one processor, that the remote vehicle is a traffic impediment based on the input signal;

determining, using the at least one processor, a predicted slowdown event based on the input signal;

generating, using the at least one processor, an actuation signal in response to the at least one processor determining the traffic impediment, the speed profile, and the predicted slowdown event; and providing, using at least one notification device, a notification to a user that the remote vehicle is a traffic impediment associated with a predicted slowdown event in response to the at least one notification device receiving the actuation signal from the at least one processor, wherein the speed profile of the remote vehicle indicates a predicted frequency of stops, and the at least one processor is further programmed to:

comparing the predicted frequency of stops for the remote vehicle to a stop frequency threshold; and determining that the remote vehicle is the traffic impediment in response to the at least one processor determining that the predicted frequency of stops is above the stop frequency threshold, wherein the speed profile indicates an average acceleration of the remote vehicle, and the at least one processor is further programmed to:

comparing the average acceleration of the remote vehicle to an acceleration threshold; and determining that the remote vehicle is the traffic impediment in response to the at least one processor determining that the average acceleration is below the acceleration threshold, wherein the speed profile indicates an estimated weight of the remote vehicle, and the at least one processor is further programmed to:

comparing the estimated weight of the remote vehicle to a predetermined weight threshold; and determining that the remote vehicle is the traffic impediment in response to the at least one processor determining that the estimated weight is above the predetermined weight threshold, and wherein the speed profile indicates an average speed of the remote vehicle, and the at least one processor is further programmed to:

comparing the average speed of the remote vehicle to a predetermined average speed threshold; and determining that the remote vehicle is the traffic impediment in response to the at least one processor determining that the average speed is below the predetermined average speed threshold.

15. The method of claim 14 further comprising:

controlling, using a longitudinal control submodule of the system, at least one of a propulsion actuation device and a braking actuation device to enable the ego vehicle to pass the remote vehicle in response to the longitudinal control submodule receiving the actuation signal from the at least one processor; and controlling, using a lateral control submodule, a steering actuation device to enable the ego vehicle to pass the remote vehicle in response to the lateral control submodule receiving the actuation signal from the at least one processor.

16. The method of claim 14 further comprising:

determining, using the at least one processor, a classification of the remote vehicle in response to the at least one processor receiving the input signal from the at least one input device;

comparing, using the at least one processor, the classification of the remote vehicle to a lookup table comprising a plurality of predetermined classifications and a plurality of associated empirical speed profiles in response to the at least one processor determining the classification of the remote vehicle;

determining, using the at least one processor, the speed profile of the remote vehicle in response to the at least one processor comparing the classification of the remote vehicle to the lookup table;

determining, using the at least one processor, at least one surrounding vehicle in response to the at least one processor receiving the input signal from the at least one input device, where the remote vehicle and the at least one surrounding vehicle are located in a common region and have at least one of a common make, a common model, a common model year, a common engine type, and a common engine size;

determining, using the at least one processor, a surrounding speed profile of the at least one surrounding vehicle; and defining, using the at least one processor, the speed profile of the remote vehicle as the surrounding speed profile of the at least one surrounding vehicle.

* * * * *